Patented Apr. 14, 1925.

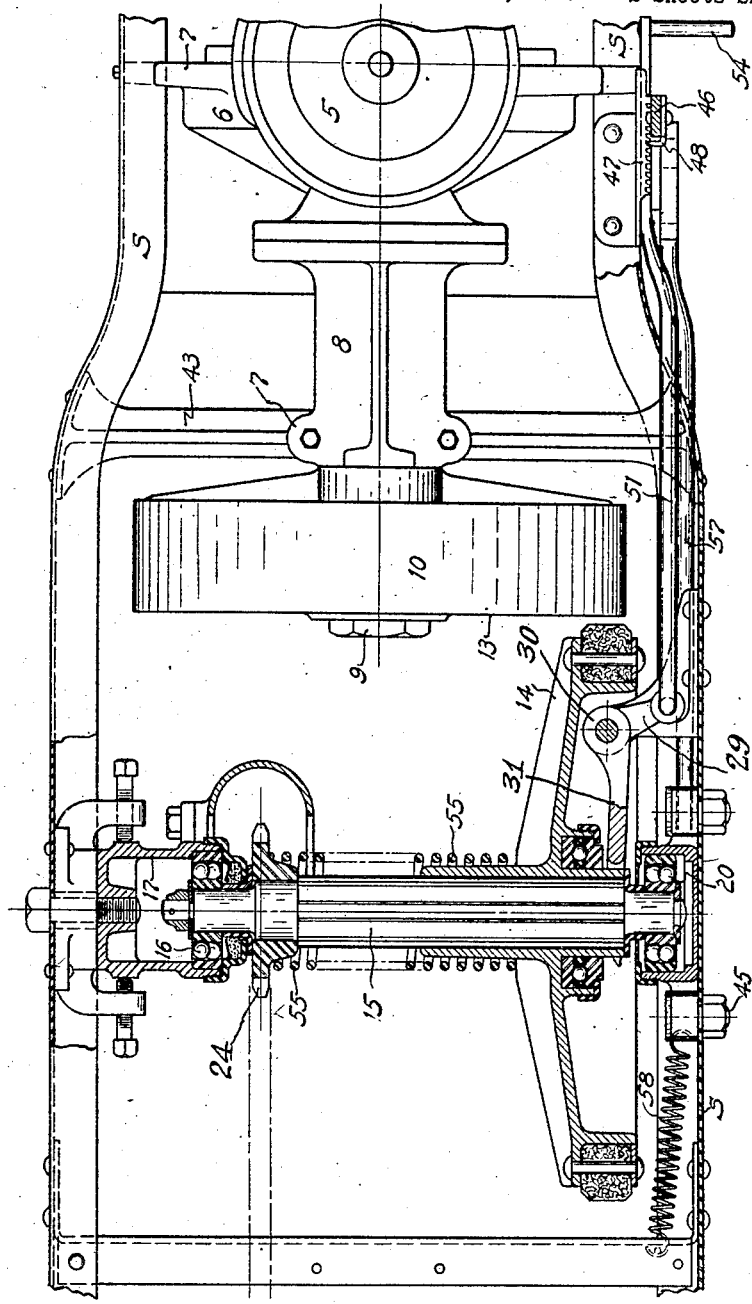

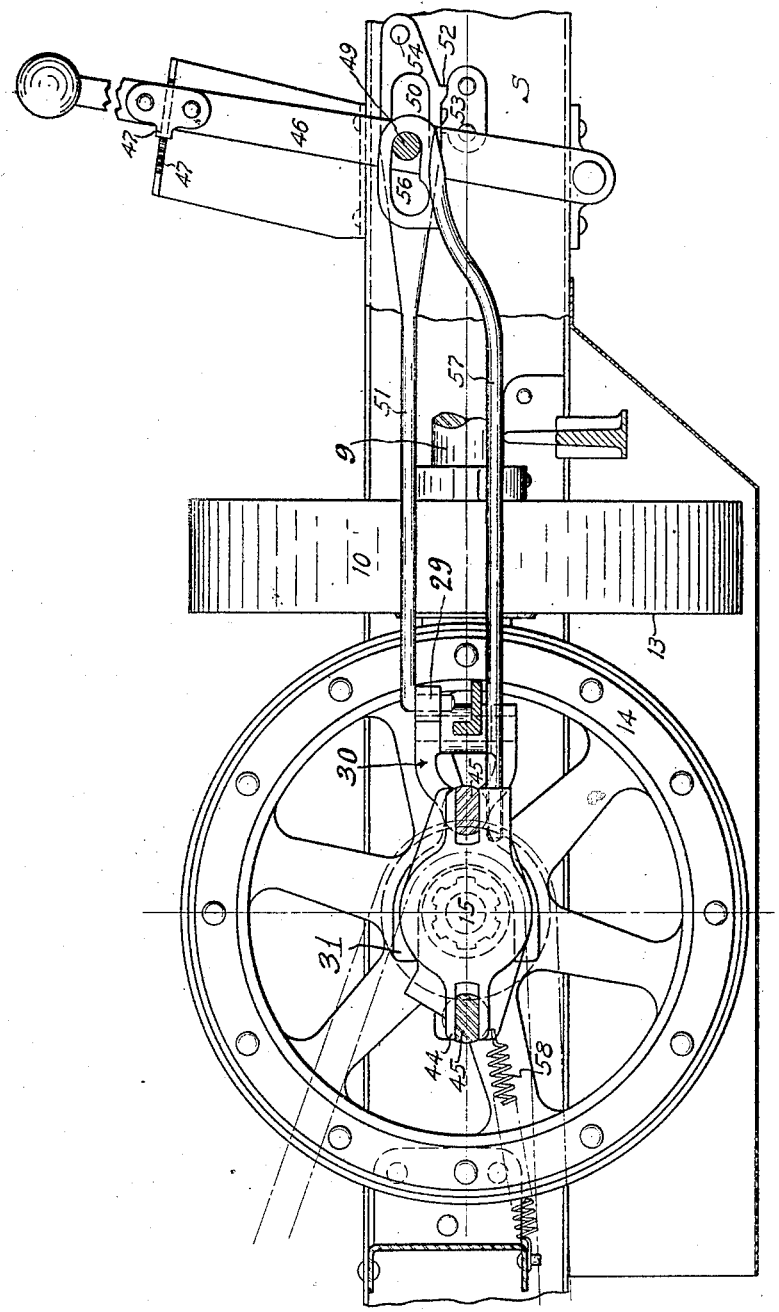

1,533,331

UNITED STATES PATENT OFFICE.

CARL A. NERACHER, OF SYRACUSE, NEW YORK, ASSIGNOR, BY MESNE ASSIGNMENTS, TO NER-A-CAR CORPORATION, A CORPORATION OF NEW YORK.

MOTOR-CYCLE-OPERATING MECHANISM.

Application filed March 26, 1920, Serial No. 368,962. Renewed July 14, 1924.

*To all whom it may concern:*

Be it known that I, CARL A. NERACHER, a citizen of the United States, residing at Syracuse, in the county of Onondaga and State of New York, have invented new and useful Improvements in Motor-Cycle-Operating Mechanism, of which the following is a specification.

This invention relates to motorcycle operating mechanism.

The primary object of the invention is to provide a friction drive or transmission mechanism for a motorcycle of novel and improved construction which will facilitate the control of the machine in starting and in changing speeds. More particularly the invention contemplates a control mechanism whereby the movement of one friction element over the face of the other and the movement of one to and from the other are effected through operation of a single controlling member such as a lever.

Other incidental objects will be referred to in the following description of the preferred embodiment of the invention illustrated in the drawings appended hereto.

Inasmuch as some features of the improvements are specially adapted for use with a motorcycle having the substantially horizontal side bar frame construction illustrated in my co-pending application, Serial No. 290,979, filed April 18, 1919, for motorcycle, this invention has been illustrated in connection with such frame construction. It is to be understood, however, that many of the features of improvements are not limited to this special type of vehicle and are applicable to other motorcycles.

A preferred embodiment of the invention is illustrated in the accompanying drawings, in which—

Fig. 1 is a plan view of the motorcycle engine and power-transmitting mechanism.

Fig. 2 is an enlarged side elevation of a portion of the mechanism shown in Fig. 1 with parts shown in section.

The type of motorcycle to which the improvements are herein shown as applied is one in which a pair of generally parallel substantially horizontal side members S, spaced apart, form a chassis on which is mounted the power plant and all other parts of the machine.

The power plant includes the engine 5 supported on engine bed 6, having feet 7 bolted to the side frame members S. The engine crank case 8 is supported on the cross frame member 43. Preferably the cylinder extends vertically and the crank case horizontally, so that the crank shaft 9 extends horizontally beyond the end of the crank case. The extending end of the crank shaft 9 carries a fly wheel 10.

The fly wheel has a flat rear face 13 forming a friction disc against which the friction wheel 14 is adapted to operate. The friction wheel 14 is shiftable toward the center or the periphery of the friction disc 13 and into and out of engagement with the disc for changing the driving ratio and connecting and disconnecting the engine from the motorcycle drive wheel.

The friction wheel 14 is carried by a shaft 15 mounted transversely of the chassis having end bearings carried in the side frame members S. The bearing 16 for the shaft is carried in the housing 17, adjustably bolted to one of the frame members S. The other shaft bearing 20 is provided with forked lugs 44 straddling flat bolts 45 which pass through the adjacent side bar S. The bearings 16 and 20 are self-aligning bearings. The mounting of the shaft 15 permits the end carrying the friction wheel 14 to be swung about the other end as a pivot, whereby the wheel 14 may be brought into and out of frictional engagement with the friction face or disc 13. The friction wheel 14 is rotatable with its shaft but is splined thereto so as to be movable axially of the shaft, so that the wheel may bear at various distances from the periphery of the friction disc 13, thereby providing for varying driving ratios between the engine crank shaft and the shaft 15.

The shaft 15 also carries a sprocket wheel 24 which is connected by a suitable chain with the sprocket of the motorcycle driving wheel, not shown. Chain adjustment is accomplished by means of the adjustable support for the bearing 16 of the shaft 15.

Control of the position of the friction wheel on its shaft and with relation to the friction disc 13 is by means of a hand lever 46. Lever 46 is pivoted to side bar S and is held adjustably in any position of its travel by means of a rack 47 engaged by tooth 48 on the lever. Lever 46 is provided with a pin 49 which engages in a longitudinal slot 50 in a link 51. Link 51 controls the shifting of the friction wheel on its shaft by its connection with arm 29 of the shifting member or bell crank lever 30 the outer arm 31 of which bears against the hub of friction wheel 14. Link 51, near its forward end, is provided with a downwardly extending tooth 52 engaging with the rack 53 for holding the link 51 and hence the friction wheel, in either low or intermediate gear position. Forward of the tooth 52 the link 51 has a toe piece 54. The rider, by pressing upward on the toe piece 54 may disconnect the tooth from the rack and allow the friction wheel to shift to its next higher ratio driving position. A spring 55 surrounds the shaft 15 to move wheel 14 to its high speed position.

The pin 49 of the lever 46 also engages in a slot 56 in the link 57. Link 57 is attached to the bearing 20 and controls the engagement and disengagement of friction wheel 14 and friction disc 13 as described for the link 38 in Fig. 1.

The relation of links 51 and 57 and the lever 46 is such that both links may be operated together by the lever or link 57 may alone be operated. As illustrated in the drawings, link 51 is in its forward position, whereby friction wheel 14 is in its high speed position and link 57 is in its rearmost position, whereby the friction wheel is out of engagement with the friction disc. Rearward movement of the lever (to the left, Fig. 2) will always pull both links to their rearmost position, whereby the parts will be in starting position. That is, with the friction drive set for low speed and the friction surfaces out of engagement, link 51 will be held in this position by engagement of the tooth 52 with rack 53. Forward movement of the lever will engage the friction surfaces by pulling forward on link 57 without moving link 51. To attain a higher speed ratio, the toe piece is elevated and tooth 52 allowed to engage the right hand rack tooth, Fig. 4, thus obtaining the intermediate speed. Likewise, another operation of the toe piece will place the parts in high speed driving position.

If desired a spring 58 may be employed to assist in disconnecting the friction parts as the lever is moved backwards, whereby the driving friction may be nicely adjusted without actual disengagement of the parts.

Operation: It will be seen that the bell crank 31 merely bears against the driven wheel, and may be withdrawn to allow the wheel to move automatically to the high speed position, or to an intermediate position, in accordance with the extent to which the bell crank is rocked backwardly away from the wheel. The wheel is drawn against the disc by a rod 57 operated by lever 45, under the direct control of the driver, so that the pressure between the friction elements may be varied. By these arrangements the motor may first be started with the wheel out of engagement with the disc. The wheel is then set to the low speed position and pressed against the disc with whatever pressure is required for getting the vehicle under way at minimum speed. The rider then withdraws the bell crank to the high or intermediate position, but the wheel will not move outwardly to increase the speed of the vehicle, or at least will move very slowly until the pressure of the wheel against the disc is diminished. When the rider relieves this pressure a little, the wheel will move automatically toward the edge of the disc at a rate proportionate to the diminution of the pressure. The rider may thus set the mechanism for the high speed, but he can thereafter choose the proper time for effecting the change, exercising a discretion depending, for example, upon the road conditions and the performance of the motor. He may then control the acceleration through control of the pressure between the wheel and the disc. The transmission is therefore continuous. It is not necessary, in changing speed from low to high, or intermediate, to interrupt the driving action of the disc on the wheel. The motor does not have a chance to race. Sudden starts and shocks are avoided.

By the mechanism and arrangement of parts herein described, a compact, rigid power unit is obtained, which is easily and accurately controlled. The embodiments described are illustrative of the principles of the invention, although other embodiments and modifications may be made without departing from the invention as defined in the appended claims. However, the generic invention common to this application and my copending application Serial No. 491,781 filed August 12, 1921, as a continuation in part hereof, is not claimed herein, being claimed in said application Serial No. 491,781.

What I claim as new and desire to secure by Letters Patent of the United States is—

1. A friction drive for motorcycles including a friction face, a friction wheel for engaging said face, means tending to move said wheel radially toward the periphery of the friction face, a bell crank lever for shifting said wheel radially toward the center of said face which bell crank lever is retractable from said wheel, holding means for holding said wheel in its shifted position and means operable by the foot of the motorcycle operator for releasing said holding means and permitting said friction wheel on retraction of the bell crank lever to move toward the periphery of said face.

2. In combination with the motor of a vehicle of the motorcycle type, mechanism for transmitting power from the motor to the traction wheel of the vehicle comprising a friction disc, a friction wheel means tending to move said wheel across the face of the disc from the low speed position toward the high speed position, a shifting member to move said wheel to said low speed position which may be set to stop the wheel for a higher speed position, and a single controlling member for operating said shifting member and for producing a variable pressure between said wheel and disc.

3. In combination with the motor of a vehicle of the motorcycle type, mechanism for transmitting power from the motor to the traction wheel of the vehicle comprising a friction disc, a friction wheel, a driven shaft on which said wheel is movable longitudinally, means for mounting said shaft so that it has angular movement toward and away from said disc, a shifting member for moving the wheel along the shaft to the low speed position which may be set to stop the wheel at a higher speed position, means tending to move the wheel from the low to the high speed positions, and a single controlling member for operating said shifting member and for producing a variable pressure between said disc and wheel.

4. In combination with the frame and motor of a vehicle of the motorcycle type, a disc driven by the motor, a shaft substantially parallel with the disc mounted so as to have angular movement to and from the same, a friction wheel splined on said shaft, an operating member for drawing said wheel against said disc, a shifting member operated by the aforesaid operating member which bears against said wheel for forcing it to the low speed position, the wheel being free to move to a higher speed position when said shifting member is withdrawn therefrom, and a spring which tends to force said wheel to the high speed position.

5. In combination with the frame and motor of a vehicle of the motorcycle type, a disc driven by the motor, a shaft substantially parallel with the disc, a slide on which one end of said shaft is mounted, an operating member for moving the slide toward the disc, a friction wheel splined on said shaft, a shifting member moved by said operating member which bears upon the wheel to force it to the low speed position, and a spring tending to return the wheel to the high speed position.

6. In combination with the frame and motor of a vehicle of the motorcycle type, a disc driven by the motor, a shaft substantially parallel with the disc mounted so as to have an angular movement to and from the same, a friction wheel splined on said shaft, an operating member for drawing said wheel against said disc, a bell crank on the frame operated by said operating member having a forked end straddling said shaft and bearing against the wheel to force the same to the low speed position, and a spring to move the wheel in the other direction.

7. In combination with the frame and motor of a vehicle of the motorcycle type, a disc driven by the motor, a shaft substantially parallel with the disc mounted so as to have an angular movement to and from the same, a friction wheel splined on said shaft, an operating member for drawing said wheel against said disc, a bell crank on the frame operated by said operating member having a forked end straddling said shaft and bearing against the wheel to force the same to the low speed position, a spring to move the wheel in the other direction, and means adapted to be set to hold the bell crank for positioning the wheel either for low speed, high speed or an intermediate speed.

8. In combination with the frame and motor of a vehicle of the motorcycle type, a disc driven by the motor, a shaft substantially parallel with the disc mounted so as to have an angular movement to and from the same, a friction wheel splined on said shaft, a slotted link for drawing said wheel against said disc, a lever engaging the slotted portion of the link, a bell crank on the frame having a forked end straddling said shaft and bearing against the wheel to force the same to the low speed position, a slotted link engaging said lever and connected to said bell crank, and a spring which tends to force the wheel to the high speed position.

9. A friction gearing for motorcycles and the like, comprising a pair of coacting friction elements one of which is movable across the other to vary the speed ratio between the same, a shifting member which bears against the movable element to force the same to and releasably hold the same in the low speed position, said element being automatically movable, when released by said member, toward the high speed position, and means comprising a single controlling member for operating said shifting member to move the movable friction element to a low speed position and for producing a driving pressure between said elements which may be decreased to allow the movable element when released to move toward the high speed position, controllably, without interrupting the driving relation between said elements.

10. In combination with the frame and motor of a vehicle of the motorcycle type, a disc driven by the motor, a shaft substantially parallel with the disc mounted so as to have an angular movement to and from the same, a friction wheel splined on said shaft, a slotted link for drawing said wheel against said disc, a lever engaging the slotted portion of the link, a bell crank on the frame having a forked end straddling said shaft and bearing against the wheel to force the same to the low speed position, a slotted link engaging said lever and connected to said bell crank, a spring which tends to force the wheel to the high speed position, and means for releasably engaging said last named link to hold the wheel either in a high speed, low speed or intermediate speed position.

11. A friction gearing for motorcycles and the like, comprising a driven friction disc, a shaft in approximate parallelism with the disc and mounted so as to have angular movement to and from the disc, a wheel slidably and non-rotatably arranged on said shaft, a spring tending to move said wheel to the outer end of said shaft, a bell crank bearing freely on the other side of the wheel, a rod for operating said bell crank, means engageable by said rod for holding said bell crank in different positions, a rod for moving said wheel to and from the disc, and a single operating lever with which said rods are slidably engaged in such manner that the angular movement of the lever in one direction imparts longitudinal movement to one of the rods without moving the other and in the opposite direction imparts longitudinal movement to the second mentioned rod without moving the first mentioned rod.

12. A friction gearing for motorcycles and the like, comprising a driven friction disc, a shaft in approximate parallelism with the disc and mounted so as to have angular movement to and from the disc, a wheel slidably and non-rotatably arranged on said shaft, a spring tending to move said wheel to the outer end of said shaft, a bell crank bearing freely on the other side of the wheel, a rod for operating said bell crank, means engageable by said rod for holding said bell crank in different positions, a rod for moving said wheel to and from the disc, a single operating lever with which said rods are slidably engaged in such manner that the angular movement of the lever in one direction imparts longitudinal movement to one of the rods without moving the other and in the opposite direction imparts longitudinal movement to the second mentioned rod without moving the first mentioned rod, and a spring which tends to move the shaft so as to draw the wheel away from the disc.

In witness whereof, I have hereunto subscribed my name.

CARL A. NERACHER.